United States Patent [19]

Prince et al.

[11] 4,050,085
[45] Sept. 20, 1977

[54] AUTOMATIC LIGHT CONTROL SYSTEM

[75] Inventors: Paul R. Prince; Bernard J. Skehan, both of Manhattan Beach; Jay M. Hansen, Santa Monica, all of Calif.

[73] Assignee: Hughes Aircraft Company, Culver City, Calif.

[21] Appl. No.: 830,589

[22] Filed: June 4, 1969

[51] Int. Cl.² .............................................. H04N 5/38
[52] U.S. Cl. ...................................... 358/219; 358/228
[58] Field of Search .......................... 178/7.2 E, 7.92; 358/228, 219

[56] References Cited

U.S. PATENT DOCUMENTS

| | | | |
|---|---|---|---|
| 3,086,077 | 4/1963 | Mayer | 178/7.2 E |
| 3,182,125 | 5/1965 | Kampmeyer et al. | 178/7.92 |
| 3,389,221 | 6/1968 | Macdonald | 178/7.92 X |
| 3,555,181 | 1/1971 | Thommen | 358/228 |

Primary Examiner—Howard A. Birmiel
Attorney, Agent, or Firm—Walter J. Adam; William H. MacAllister

[57] ABSTRACT

A system to automatically regulate input light and television camera tube gain to maximize scene viewing continuity while protecting against overloads. An electro-optical input assembly, an image intensifier, SEC vidicon and video pre-amplifier produce required video signals. The signals are fed along a common path comprising a keyed clamp and field gating circuit, parallelly connected peak and average detectors, detector output weighting, amplifying and attenuator circuits. The path branches to a control function stage and a high voltage power supply to form a fast vidicon accelerating voltage adjusting loop. The path also branches to iris threshold and dead zone stages, to cause an iris motor to control the iris position in accordance with ambient durational and transient light conditions.

19 Claims, 4 Drawing Figures

AUTOMATIC LIGHT CONTROL SYSTEM

BACKGROUND OF THE INVENTION

1. Field of the Invention

The present invention relates to real time electrooptical imaging for the purposes of object detection and/or tracking systems and navagation. More particularly, the invention relates to an automatic light control system to regulate entry of light and television camera tube voltages, for example, for controlling the iris of a lens assembly in conjunction with nonlinearly and stably controlling the accelerating voltage of an SEC vidicon and protecting it against damage under a wide range of ambient relatively steady state and transient light conditions.

2. Description of the Prior Art

An SEC vidicon target can suffer a permanent reduction in gain as a result of excessive energy falling on the target. This is reported in "The Effect of Intense Exposure on SEC Targets," A. H. Boerio, Westinghouse Electronic Tube Division, Elmira, New York, Report No. ET-5, dated Apr. 13, 1965. Recent SEC vidicon tube data include more specific operational limitations. Though optimum operation is far below these exposure levels, a reliable means must be provided for sensing possible transient exposures at damaging levels. The exceptionally large dynamic range of the camera system makes it imperative to protect the vidicon against possible over-exposures of the system from large scene light level changes, maintenance procedures, (inadvertent operation with critical circuit boards removed, etc.), and component failures. The light level dynamic range over which the camera system sensitivity must be controlled is determined as follows: The maximum apparent scene brightness that the system can tolerate under full gain conditions is determined by the saturation and permanent "burn-in" light level of the SEC vidicon. The expression for the scene brightness for this condition is given by:

$$B_{HIGH\ GAIN} = [4(f/no)^2 E_K]/\tau(G_{max}),\ \text{ft.- lamberts}$$

where
$f/no$ = aperture ratio of the lens = 1.3 for example
$\tau$ = total system transmittance = 0.7 for example
$E_K$ = Saturation faceplate illumination level of SEC vidicon
= $0.53 \times 10^{-2}$ ft. candles for example
$G_{max}$ = maximum intensifier luminance gain = 400(0.4)
= 160 for example
which gives
$B_{HI\ GAIN} = 0.32 \times 10^{-3}$ ft.-lamberts The specified maximum scene brightness level over which the camera system must operate may be $B_{LO\ GAIN}$ = $1 \times 10^4$ ft.-lamberts, for example. Thus, the required dynamic range of ALC is $$(B_{LO\ GAIN}/B_{HI\ GAIN}) = (1 \times 10^4)/(0.32 \times 10^{-3}) = 3.1 \times 10^{-7}$$

Automatic rapid control of the system sensitivity over a wide dynamic light-level range while providing adequate camera tube protection requires gain and attenuation control in various system elements. The nature of these controls is determined by the light level dynamic range and the optimum operating points of the camera tube, e.g., the SEC vidicon tube.

Prior art methods of adjusting and protecting television camera tubes such as vidicon tubes from the effects of excessive light input have been known. Such systems include automatic gain control loops or light entry control means. Prior art systems do not provide for control of both the iris and the vidicon tube while providing a non-linear control of the vidicon. Further, such systems are not stably operative over a wide dynamic range of ambient light conditions including starlight to dusk or starlight to sunlight. Prior art systems do not provide the stable, high speed and safe operation provided by the system of this invention.

SUMMARY

An automatic light input and television camera tube control system responsive to a wide variety of ambient durational and transient illumination with selective area, and weighted brightness ranges and conditions comprising a lens assembly including an automatically adjustable iris, a television camera tube such as an SEC vidicon and associated circuits to responsively provide video image signals, a first fast integrating feedback loop to control iris closing and opening to realize a stabilizing video level, and a second faster feedback control loop to provide a specific gain and camera tube operating point for optimum signal to noise ratio, resolution and protection capability. The dual mode automatic light control loop is responsive to change in the brightness conditions to accordingly very rapidly and linearly provide camera tube gain control and to rapidly regulate the iris position for maximum continuous proper and safe operation. In one embodiment of the invention, control loop common path means are provided and comprise preamplifier, keyed clamp and field gating means responsive to the camera tube video output and selectively to signals from synchronizing and other timing waveform generating circuits, video peak and average detection, weighting function, amplifier, and attenuator means to provide an automatic light control level. Between a loop common path automatic light control level output point and the SEC vidicon image section potentials is coupled a high voltage control function circuit to determine operating point locus and with a high voltage power supply circuit both to maintain the television camera tube gain constant.

The servo loop in adjusting the iris position regulates the proportion of ambient light permitted to enter. The iris position adjusting loop comprises threshold circuit means determining a desired light level. Responsive to the threshold circuit means are coupled dead zone means, whereby undesirable iris response to minor transient light changes is avoided, and iris motor means to regulate the position of the iris. By the television camera tube (vidicon) gain and iris opening regulating means of the invention, the operating point is translated such that dangerous overloads of the television camera tube are avoided and need for opening and closing the shutter is minimized for local or scenewide, transient, rapid or gradual and/or significant changes in scene lighting.

The present invention overcomes the hereinabove mentioned and other disadvantages of prior art devices and provides additional advantages. For example, the invention provides a circuit which may be incorporated in television systems and which is adaptable under low light ambient conditions as well as to sunlight and bright light conditions. The invention provides for control of both the iris and the camera tube to protect against overloads, provide constant rate of change of gain and maximizes continuity of operation in a system which includes an iris, and a camera tube such as a vidicon tube and which may include an image intensifier tube or tubes. The invention provides for separate control of the iris to regulate the amount of light which passes through to the image intensifier and it rapidly, closely and with the critical stability required controls the camera tube accelerating voltage. The present invention provides a system which compensates for the non-linearity of the SEC vidicon gain with accelerating voltage over a varible range of vidicon tube operating conditions. It provides a relatively stable iris motor control system wherein means are provided to avoid the hunting and jitter attendant to continuous following of momentary changes in the iris loop, particularly those of a minor transient nature. The present invention further enables automatic adjustment of system sensitivity wherein the system includes iris, image intensifier, and vidicon devices, over a large dynamic range for example of the order of 1 to 1,000,000 ($10^6$) and provides additional means to extend the range to the order of 1 to 100,000,000 ($10^8$). Rapid adjustment of the system is provided. The light control system enables a constant video level to be maintained. The system works at optimum operating points of the vidicon. It does not interfere or interact with an electronic image motion compensation circuit which may also be introduced in an overall system of which it may form a portion. It minimizes transient overloads. Because of the rapid acting, accelerating voltage controlling inner loop, the system shifts the operating point such that relatively transient changes are handled without causing severe overload conditions wherein the shutter will be tripped unnecessarily by such transients. The invention provides for regulating the iris position to enable the stabilizing video level to be realized and for control a high voltage of the SEC vidicon tube to provide a specific gain and operating point in the SEC characteristics for optimum signal to noise ratio, resolution, and protection capability.

Accordingly, a principal object of the present invention is to provide an automatic means and/or method to stabilize the operating point of a device having a controllable gain element (such as an accelerating electrode or a means to vary target potential) under various ambient conditions and inputs.

Another object of the present invention is to provide an automatic light control means and/or method which will protect a television camera tube and stabilize its operating point under various ambient conditions of light.

Another object of the present invention is to provide an automatic light control means and method in association with a system to electrically and optically view a target and provide a video indication therefor wherein nonlinear means to view the target is continuously regulated to cause it to provide linear regulation of attenuation of light input to a range of illumination levels such that a stabilizing video level is realized and wherein is provided regulation of the gain of a vidicon tube at optimum operation points by nonlinearly regulating the accelerating voltage therefor and simultaneously protecting the vidicon tube against overloads.

Another object of the present invention is to provide for linear control of a nonlinear light entrance in an optical system and to provide for protection against overloads and for linear operation of a vidicon tube which is responsive to the light leaving the iris to provide a video image.

Another object of the present invention is to provide an automatic light control system including an iris and a linear means for regulating its position and therefore the amount of attenuation of light passing therethrough, and a second faster acting vidicon tube protecting loop including a nonlinear means responsive to the output of the vidicon tube to feed back a voltage which will linearly accordingly change the gain of the imaging section, wherein there is provided video peak detection and video average detection means such that the operation can be optimized for a variety of scenes including low level ambient light and relatively high level ambient light, wherein the system will provide averaging for the entire area being observed and will provide for peak detector operation for unusually bright spots within that area, and wherein weighting is provided so that the peak spots of illumination do not unduly affect the output and there is still provided a useful indication of the actual scene being observed.

Another object of the invention is to provide automatic control of television sensitivity over light-level ranges including low level light and/or light of special spectrum characteristics and compositions wherein there is provided constant optimum illumination on the camera tube photocathode and a camera tube such as a vidicon is operated at high target current levels by means of automatic control of image section potentials and wherein the camera tube is continuously protected against overloading, for example, during small light level transients.

The above-mentioned and other features and objects will be apparent by reference to the following description taken in conjunction with the accompanying drawings wherein:

FIG. 1 is a partially block and partially schematic and graphic representation of a first preferred illustrative embodiment of the automatic light control subsystem of the present invention which may be provided in a television camera system, and illustrates an optical system comprising an iris, image intensifier, a SEC vidicon tube and output circuits, a very fast vidicon accelerating voltage feedback loop and a fast acting iris motor controlling loop;

FIG. 2 is a graphical representation to show performance of the automatic light control system of FIG. 1 wherein the video level output from a video preamplifier which amplifies the video output from the vidicon of the FIG. 1 embodiment is plotted against the scene brightness in foot-lamberts as viewed by the optical system of the preferred embodiment and shows that the video output level is held constant over a wide range of ambient light conditions of the order of $10^6$ to $10^8$ times the minimum light level;

FIG. 3 is a graphical representation of the vidicon characteristics of the preferred illustrative embodiment plotting the target current against the vidicon photocathode illumination from the image intensifier and wherein several exemplified anode-cathode voltage characteristic operating curves are illustrated in conjunction with a representation of the overload level to show that with changing ambient light, the operating point follows the path of the curve Q-R illustrated in dashes so that a minimum of shutter operation is required; and FIG. 4 is a schematic representation of a first preferred illustrative embodiment of the high voltage power supply control function circuit which may be employed in the embodiment of FIG. 1 and wherein is illustrated an operational amplifier which modifies the incoming DC attenuated signal level to a controlled nonlinearity at relatively large automatic light control input levels and linearly at intermediate ALC levels, and circuitry for a controlled maximum output voltage at low ALC level input to regulate and limit the output of the high power voltage power supply applied as accelerating voltage to the vidicon tube.

DESCRIPTION OF THE PREFERRED EMBODIMENT

Figure 1:
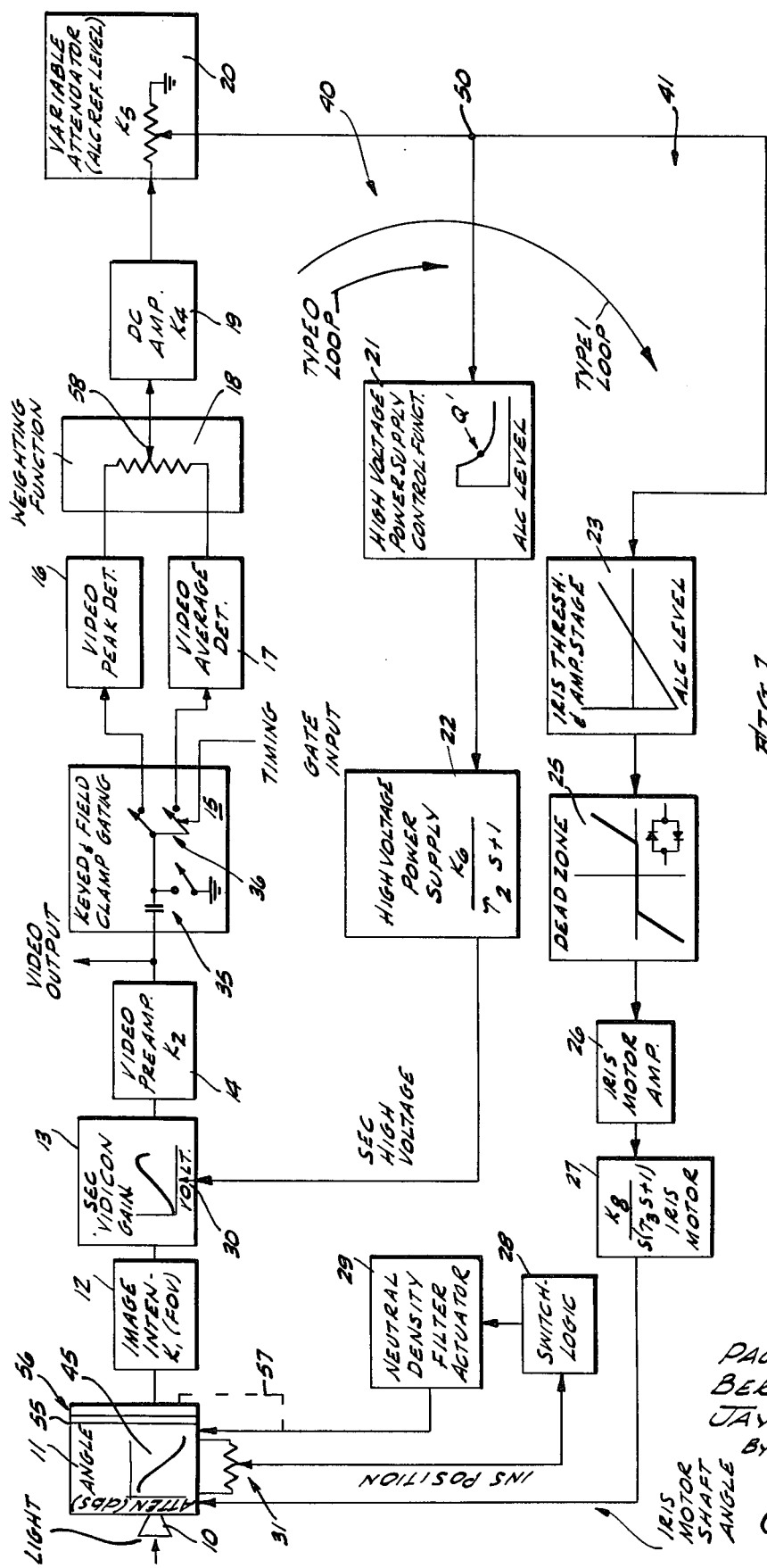

The present invention is employable as a protective and regulating subsystem for a television camera system under a wide range of ambient light conditions, wherein transients may momentarily illuminate the scene or scene portions, and wherein a uniform video output and protection of the camera at all times is a requirement. Such a subsystem is employabled in many applications. For example, it could be highly useful in a system for detecting and tracking targets under optionally very low light conditions from starlight to very highly illuminated light conditions such as sunlight. Requirement may be that a target must be viewed, detected, and recognized and the optical input converted to video signals to be presented to a remote display presentation wherein the signals may be utilized for navigation and fire control purposes. For example, the system of the present invention is applicable to a system wherein is provided illumination at night or under dark conditions by a search light which may be an infrared light emitter emplaced on a helicopter and wherein a remote viewing system may comprise optical entry means to admit infrared and/or other light frequency energy, an image intensifier, and a television camera tube such as a vidicon to generate a video signal indicative of the object or scene being viewed. The SEC vidicon is an extremely sensitive camera tube and can be damaged by illumination levels of excessive energy.

The camera system in which the invention is incorporated may include a protection subsystem comprising protection logic operating in conjunction with the automatic light control (ALC) subsystem of the invention. The protection logic basically consists of a large OR gate into which signals arising out of a variety of conceivable failures and extreme conditions are fed as inputs. The possible occurrence of most of these failures under normal system operation is remote. However, in the event they do occur, shuttering becomes necessary to protect the SEC vidicon tube (over and above the protection provided by the ALC). Among the various inputs to the protection OR gate may be power supplies of the camera system, a sweep failure signal, power source ON voltage to insure that scene light conditions do not reach the SEC vidicon until the system warm up has been completed, circuit board and cable interlocks, video overloads, sun sensing, flash sensing, and sensing that the optimum vidicon target current is being exceeded by a prescribed amount.

Upon activation of the shuttering command the high voltage power supply is turned off, the shutter is closed, and the iris is commanded to close. The shuttering procedure may be interlocked with a delay such that, once activated, the shuttering continues for about two seconds. In this way, the cause may have disappeared and the scene image is attenuated 60 to 80 db by virtue of the closing iris.

In order to operate with continuity of viewing while protecting against overloading the television camera tube (vidicon tube) the shutter should be open as continuously as possible. To that end the automatic light control system of the invention is required to protect against overloading the vidicon without shutter operation while effecting optimum operation.

Automatic transient adjustment of SEC gain (the high voltage imaging section potential) has been found effective in implementing the automatic light control system of the invention. Alternatively, of course, other output level determining elements may be used to provide optimum operation below camera tube overloaded condition. A video detector is used to determine the intensity of the SEC exposure and the appropriate thresholds are provided to sense overload beyond the range of the SEC high voltage feedback control.

There are provided two feedback control loops operating from a detected video signal. The variable gain elements of the control system are the iris (an attenuator) and the SEC vidicon image section whose gain is controlled by a single control input voltage to the high voltage power supply supplying the image section voltage. The control system attempts to provide a constant optimum illumination on the SEC photocathode.

Refer to FIG. 1. An optical system 10, a lens assembly 11 including an automatic iris 45 and a shutter subassembly (not separately numbered), a concentrically graded neutral density attenuation plate or filter 55 and an automatically insertable and removable attenuator or neutral density filter 56 are provided. Filter 55 is disposed adjacent to the iris 45. The plate or filter 55 may comprise a darkened central portion and a radially diminishing attenuation deposit such that a large portion of the entering light is blocked near the center of the lens and a relatively smaller portion is blocked as the iris is opened radially outward. The attenuator or filter 56 may be designed to have a transmission for example of the order of $10^{-4}$. The attenuator or filter 56 may be uniform in density and is mechanically coupled for insertion into and out of the light path of the iris 45 automatically by a solenoid (not shown) at predetermined iris positions as schematically represented by mechanical coupling means 57. The iris 45 is used in conjunction with the two neutral density filters 55 and 56 located within the objective lens assembly 11 to provide variable attenuation over more than a $10^8$ transmission range. The uniform neutral density filter 56 provides control capability over a fraction of the required dynamic scene brightness range and the attenuation required for optimum SEC vidicon tube operating points (to be described hereinbelow) at large scene brightness levels. A neutral density filter actuator 29 is provided to control the movement of filter 56.

To the lens system 11 output is coupled an image intensifier 12 to amplify the light from lens assembly 11. A camera tube such as SEC (secondary electron conduction) vidicon tube 13 having an SEC photocathode 30 is coupled to the output of image intensifier 12. The SEC vidicon tube 13 provides electrical output video signals corresponding to the input light signals received through the optical system 10. A video preamplifier 14 is coupled to amplify the output video signals from vidicon 13 and apply them through a video channel which may include video, automatic gain control (AGC), display, transmission, and/or digital computer circuits, etc. A pair of servo loops 40 and 41 are provided. Servo loop 40 is a type O loop. A type O loop, alternatively known as a positional control loop, provides a specific voltage for a given input level. A second servo or feedback loop 41 is provided to regulate the open to closed position of the iris 45 of assembly 11 to thereby regulate the attenuation of entering light. The loop 41 is a type 1 loop. A type 1 loop is an integrating loop such that for a given DC (direct current) level input there is provided a continuous change in the output. Connected to the output of the video preamplifier 14, in addition to the video output path, is a keyed clamp and field gating unit 15. The keyed clamp and field gating unit 15 comprises a keyed clamp circuit 35 and a switching field gating circuit 36 connected in series. The keyed clamp circuits 35 comprises a capacitor and a switching means (not numbered) to reestablish the DC level of the output of the video preamplifier 14. The field gate 36 comprises a switching circuit schematically represented by two parallel ganged switches (not numbered) which actually may be field effect transistor circuits. The field gating circuit 36 is optionally supplied to establish the automatic light control level from all or of a desired portion of the scene. Responsive to the output of the keyed clamp and field gating unit 15 is coupled to one of the field gating switches 36, a video peak detector 16 and to the other of the field gating switches 36 a video average peak detector 17. The output of video peak detector 16 is connected to one resistance end and the output of the video average detector 17 is connected to the other resistance end of a potentiometer 18. The slider arm of potentiometer 18 is connected to the input of a DC (direct coupled) amplifier 19 to amplify the output from field gating portion 36. To the output of DC amplifier 19 is coupled a variable attenuator 20. Variable attenuator 20 may be a potentiometer which may be controlled by an operator from a remote control knob on a control panel. The resistance portion of potentiometer 20 is connected between the output of DC amplifier 19 and ground. The slider arm of variable attenuator 20 provides an automatic light control reference level, illustrated as ALC level point 50, from which the feedback paths 40 and 41 respectively diverge to the SEC accelerating field electrode 30 and to the iris 45.

The light system 10 may be a conventional optical system such as a refractive telescope system which images a scene through the lens (not numbered), iris 45, the shutter (not numbered), and filters 55 and 56 of the lens assembly 11. In the illustrative embodiment, for example, the image intensifier 12 may be a commerical image intensifier of the type available from Varian Associates, Palo Alto, Cali. and designated 80:25, Model SP 122. Such an image intensifier tube is described in detail in the article entitled, "Image Intensifiers and the Scotoscope" by G. A. Warden, Applied Optics, Vol. 3, No. 6, page 651, June 1964. An example of an illustration embodiment camera tube 13 may be a SEC vidicon of the type available from the Westinghouse Electric Corporation, Electronic Tube Division, Elmira, N.Y., and designated WX30892. Such a device is described in the publication, "Advances in Electronics and Electron Physics," Vol. 22, Photo-Electronic Image Devices, Third Symposium, Academic Press, London, September, 1965. The characteristics of this tube are further described in an article entitled, "Secondary Electron Conduction (SEC) for Signal Amplification and Storage in Camera Tubes" by G. E. Gotze and A. H. Boerio, page 1007, Proceedings of the IEEE, Sept. 19, 1964. The video preamplifier 14 may be conventional SEC vidicon tube preamplifier follower of a type well known in the art and need not be further described. The keyed clamp 35 comprising a capacitor and switch which is grounded on one side to establish the black level of the video output signal is well known in the art. The field gating circuit 36 may be of the well known type wherein a field effect transistor(s) provide(s) series signal switching to switch the incoming signal on and off. The input signals for the field gating circuit 36 may be generated from standard synchronizing (sync) television pulses, i.e., vertical sync and horizontal sync, television signals, applied from a conventional type synchronizing generator (not shown). Additionally, timing waveform signals from a plurality of multivibrators and logic gate circuits may be provided. The timing waveforms may open and close the field gating switching circuit 36 such that a portion of the input video signals from the SEC vidicon tube preamplifier are gated through the field gating circuit 36 and applied to the video peak detector 16 and video average detector 17.

The video peak detector 16 may be a DC to 1 megahertz detector and is conventional in the art. The video average detector may also be of the type conventional in the television art. DC amplifier 19 may be a conventional direct coupled amplifier.

Figure 4:
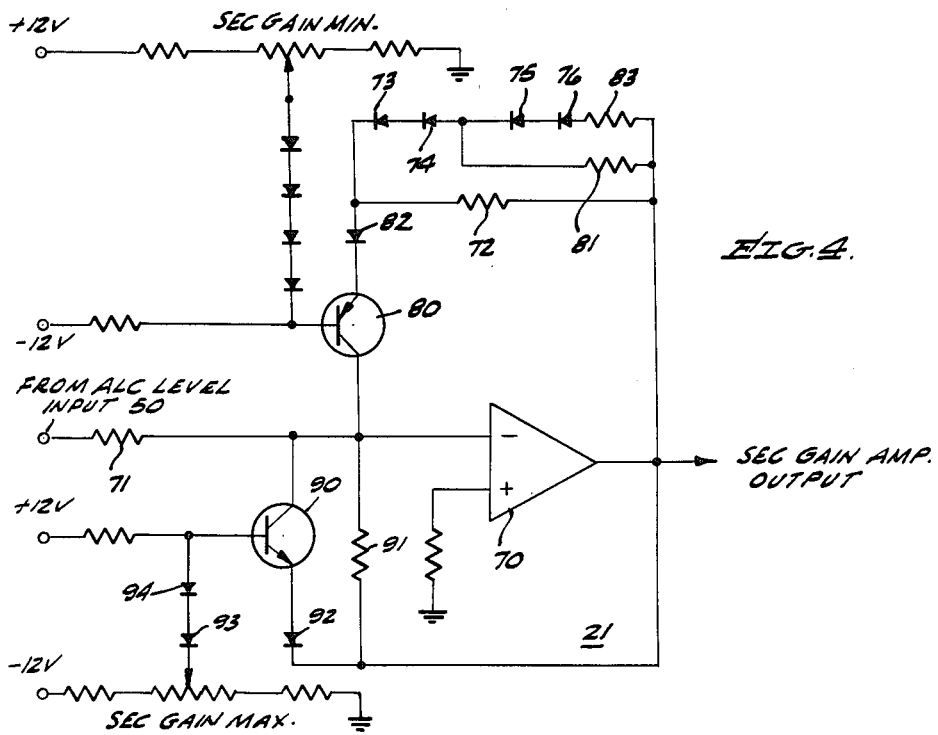

The slider arm of potentiometer 20 is coupled to ALC level point 50 and to the input to the branches of control loops 40 and 41. The SEC vidicon tube 13 has an accelerating photocathode circuit wherein is applied the SEC accelerating voltage. Coupled between the sliding arm of potentiometer 20 and the photocathode 30 of vidicon 13 is a high voltage power supply control function circuit 21 and a SEC high voltage power supply 22. The high voltage power supply control function circuit 21 is shown in FIG. 4 to be described. Circuit 21 may comprise a direct coupled amplifier with a nonlinear limiting circuit at one extreme and a cutoff circuit at the other extreme. The SEC high voltage power supply may comprise interchangeable modulator oscillator and multiplier packages which may form a plurality of power supplies, one for each voltage, such as those provided by the Venus Corporation Power Supply, Hicksville, Long Island, N.Y., or as provided by Hughes Aircraft Company, Culver City, Cali. 90230.

Optionally, power for the SEC photocathode 30 may be provided in the high power voltage supply by regulating the output of function circuit 21 in a conventional linear voltage regulator, the control element of which is a Darlington circuit, then sending the voltage signal through a 0-19 volt DC to DC converter, transformer coupling the output of the converter to a voltage multiplier where the output is stepped up to from 3 kv 8 kv accordingly and this voltage is applied to the SEC photocathode 30.

Refer again to FIG. 1. An iris opening and closing servo loop 41 is provided and comprises a threshold or an offset and an amplifier stage 23, a dead zone diode circuit 25, an iris motor amplifier 26, and an iris motor 27. In the iris opening and closing servo loop 41, connected to the slider arm of potentiometer 20 and the ALC level point 50 is the threshold and amplifier stage 23. Threshold and amplifier stage 23 may be, for example, a conventional DC amplifier with an adjustable offset comprising a summing amplifier. Iris motor 27 mechanically positions the iris 45 through a gear train and nonlinear cam arrangement within the lens assembly 11. The dead zone diode circuit 25 may comprise a pair of oppositely polarized parallelly connected diode (not numbered) such as illustrated schematically in the lower right hand corner of the block representing circuit 25. The iris motor amplifier 26 may be a bipolarity output motor driver amplifier of a conventional type for applying output in both directions to a DC motor. The iris motor 27 may be a standard permanent magnet DC motor having sufficient output to drive the iris shaft. For example, the motor may be of the type available from Globe Industries, Inc. and described in its Bulletin A-1400 SS motor of Feb. 19, 1967 and listed as having speed of 8000 to 10,500 revolutions per minute, maximum rate of torque of 0.45 inch-ounces, stall torque of 1.3 inch-ounces, 27 volts DC driving voltage with a maximum of 0.23 amps. Typically the motor may have a gear reduction of about 900–1.

The iris 45 of lens assembly 11 may be, for example, of the type available from Aerojet Delft Corporation, 125 Pinelawn Road, Melville, Long Island, N.Y. 11746, designated Aerojet Delft Deltamar 150/1.5 objective lens. This device includes the iris 45 but not the shutter which may be separately provided and conventionally assembled in assembly 11. Alternatively, to provide improved performance, a special iris may be built with a cam arrangement to provide the approximately linear log attenuation versus shaft angle curve as illustrated in the iris 45 portion of representing lens assembly 11 shown in FIG. 1. Given the curve of iris 45, a craftsman skilled in the art can readily build the iris 45 and attenuator plate 55.

To improve the range of ambient light over which the automatic light control system of the invention operates, a circuit is provided comprising a switching logic unit 28, a neutral density filter actuator 29 electrically connected to the output of unit 28 and an iris position potentiometer 31 coupled to the iris 45. The instantaneous setting of potentiometer 31 indicates the instantaneous iris 45 position. Switching logic 28 is actuated in response to a potentiometer slider arm position of potentiometer 31 which occurs when the iris 45 is beyond a predetermined limit of open or closed position. Responsive to electronic sensing of the iris 45 position switching logic 28 is enabled. Responsive to enabling of logic 28, the neutral density filter actuator 29, which may be a solenoid, is activated or deactivated to insert or remove the neutral density filter 56 automatically. The switch-in and switch-out points are predetermined. Adequate overlap is provided between the filter-in and filter-out regions such that the system operates smoothly and is stable. The filter 56 may be effectively a dark glass or glass with a reflective coating which responsive to the neutral density filter actuator 29 is emplaced in or removed from the light path within the lens assembly 11 including the iris 45 to, when in inserted position, attenuate the light by, for example, four orders of magnitude (provide a light attenuation of 10,000).

To obtain a large dyanmic range of attenuation, the filter 55 which is hereinabove described, comprises a darkened central section and is formed such that the attenuation of light in the filter is reduced radially from a maximum at the center to substantially no reduction, for example, at the edges, and is inserted in a position which is very close to the iris 45. By this means, the dynamic range of the iris 45 is extended since at the closed position a small fraction of light is permitted to be transmitted therethrough since the darkening renders it much more opaque at the center.

The uniform filter 56 has an attenuation of $10^4$ so that the total attenuation capability of the iris 45 filter combination 45, 55, and 56 is more than $10^7$. The attenuation ranges selected for the iris 45 and uniform neutral density filter 56 are near optimum so that the iris 45 is stopped down during normal daylight conditions and hence provides an improved lens modulation transfer function and good depth of field.

The switching logic 28 also provides signals that command the iris 45 to close a sufficient amount immediately before the filter 56 is moved out of position so that the increase in light level at the SEC vidicon photocathode 30 caused by the removal of the filter 56 is not sufficient to damage the tube or trip the shutter.

For further flexibility, particularly for maintenance and alignment procedures, a manual iris adjustment mode of operating (not illustrated) is included. In this condition the iris control loop 41 becomes a standard positioned command control loop with reference levels developed at the operator's control panel (range selector and vernier). The high voltage feedback loop 40 continues to function as does the video AGC, providing the fast-reaction degeneration needed for protection, but allowing some flexibility in operation.

Figure 2:
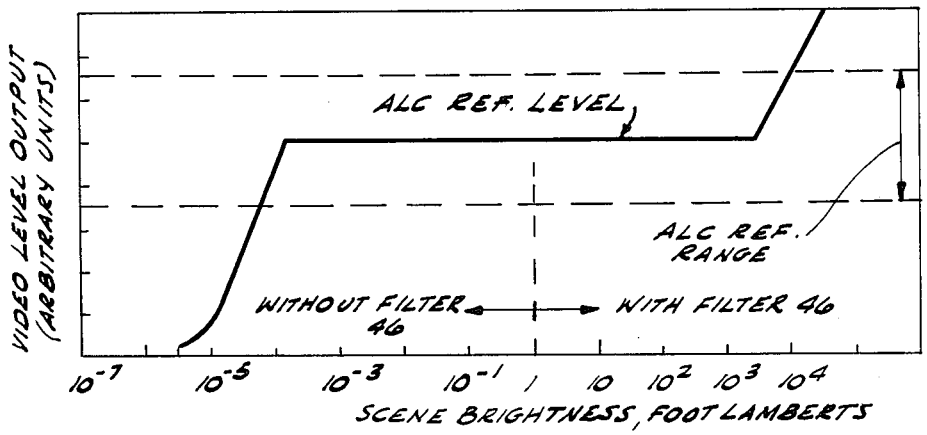

Refer to FIG. 2. FIG. 2 illustrates the automatic light control system performance. As illustrated by the left going arrow, and caption, without the neutral density filter arrangement, operation is restricted to a scene brightness of not greater than about one foot-lambert scene brightness. This represents the conditions without the filter 55 in extreme attenuated condition of the iris 45 and represents the maximum signal which may be applied to the SEC vidicon tube 13 without causing damage to the vidicon tube. By operation of the switching logic 28 and neutral density filter actuator 29, the filter or darkened lens 56 is inserted in the path of light in the iris 11 and enables an ambient light to be viewed of the order up to $10^4$ foot-candles. As FIG. 2 illustrates, the inventive automatic light control system thereby enables viewing under scene brightness conditions, for example, from the order of $10^{31.5}$ foot-lamberts to about $10^4$ foot-lamberts scene brightness. The mathematical symbols in the blocks of FIG. 1 e.g., $K8/S(\tau_3 S+1)$, indicate simplified control function symbols.

OPERATION

Figure 3:
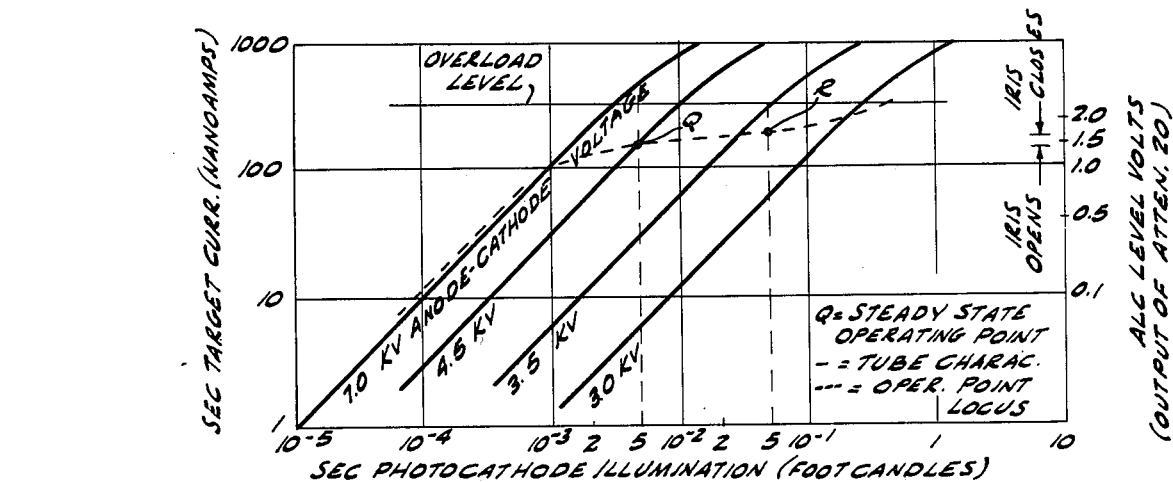

Briefly, the ALC system operates as follows. The camera video preamplifier 14 output is detected and amplified, producing a voltage level indicative a signal strength. The video detector type is important with respect to the characteristics of the scene being viewed. Peak detector 16 has a tendency to reduce gains too low when the field of view encompasses a bright spot. The composite video detector 16 and 17 is adjustable by potentiometer 18 anywhere between average level and peak level in addition to an ALC reference level control variable attenuator potentiometer 20. After attenuation, the ALC level is directed to the two control loops 40 and 41. The path of loop 41 is an integrating (type 1) feedback loop. If the ALC level is above the stabilizing level the iris 45 is driven closed, and conversely. Thus, if the light level is within the limits of the iris 45 and neutral density filters 55 and 56 the stabilizing video level will be realized. For this level, the inner control loop 40 (type 0) provides a specific gain and operating point in the SEC characteristics for optimum signal to noise ratio, resolution and protection capability. The time response of the high voltage control loop 40 is much faster than the iris loop 41. Large rapid variations in light over the full range are accommodated by use of the high voltage control function circuit 21 and power supply 22. Deviations from the stabilizing level occur only in transient conditions or the steady state situations at very low light levels when the iris 45 range has been exceeded. The control function circuit 21 also determines the actual light level at which full system sensitivity is employed (corresponding to the upper knee of the curve of FIG. 3 to be described). FIG. 3 shows the variation of the operating point on the SEC transfer characteristic. Point Q represents the steady state operating point when the ALC level has reached the stabilizing level. The operating point locus is determined by the high voltage control function circuit 21. Thus a certain amount of control is achieved by the SEC feedback loop 40 alone.

Refer again to FIG. 1. Light enters through the optical system 10, and the lens assembly 11. The image intensifier 12 amplifies the light image received through the optics 10 and lens assembly 11. In the SEV vidicon tube 13, the light image is converted to an electrical output signal. The video signal originates at the target of the SEV vidicon 13 and is generated as follows. An electron image of an optical scene exists on the target of the SEC vidicon 13 as a result of lens imaging, image intensification and demagnification, and secondary electron conduction processes. To derive a video signal from this electron image, the camera electronics performs two basic functions: beam deflection and target discharge and signal current amplification.

A beam of electrons emitted by the SEC thermionic cathode is accelerated and focused in a combined electrostatic and magnetic field. The magnetic focus field is generated by a solenoidal focus coil. The required focus coil current is supplied by the focus-current regulator in a highly stable, constant current mode, eliminating problems associated with coil electrical resistance changes caused by heating. The electrostatic accelerating and focusing voltages are supplied by the SEC low voltage supply and are filtered by the SEC low voltage filters located adjacent to the rear of the SEC vidicon tube 13. In addition, the heater for the thermionic cathode is also operated in a constant current mode preventing excess surges at turn on when the heater is cold and has a low electrical resistance.

The focused beam of electrons is deflected by a magnetic field generated by the vertical and horizontal deflection coils in response to waveforms generated by the vertical and horizontal deflection circuits. Timing signals for the deflection circuits are generated by a 525 line sync generator (not illustrated) which is located external to the TV system and applied at terminal 57. The beam of electrons is modulated by the blanking insertion circuit and is cut off during the inactive or retrace time. The required waveform for this beam modulation is generated from the vertical and horizontal deflection waveforms. The beam is also modulated during the active sweep time by a signal, from a shading correction generator (not illustrated) which reduces the "portholing" type of video level nonuniformity. In the event of a sweep failure, a sweep failure protection circuit biases the SEC cathode such that the electron beam is completely cut off preventing possible damage to the SEC target. The beam of electrons scans a rectangular pattern of horizontal lines with a 2:1 interlace and is deposited on the SEC target in an amount sufficient to discharge the existing electron image. This target electron current is coupled from the tube to the input of the video preamplifier 14. At the same point, the target and suppressor mesh DC voltages are supplied.

The raw video signal is recovered from the camera head preamplifier 14 and may be terminated at a camera electronics unit (not numbered) with a 75 ohm termination at the input of a differential amplifier (not illustrated) to minimize cross-talk and noise pickup. The signal is then split up into two processing paths. The first path is to the ALC video detection circuits of the invention. The second precessor path may send the video to the aperture correction circuitry (not shown) which enhances the video contrast over a selected range of TV system spatial frequencies.

The video signal may then be passed through an AGC video amplifier (not shown). This amplifier drives an AGC detector (not shown) whose output feeds back and controls the gain of the AGC video amplifier.

Next the signal is key clamped during the time corresponding to the camera horizontal blanking interval and effectively restores the true brightness level, i.e., the DC component of the video signal which was lost in the AC coupling networks preceding the clamped stages.

A gamma corrector stage then amplifies the video signal nonlinearly, providing higher gain for the darker portions of the scene than for the ligher portions. This is accomplished by allowing the series and shunt impedances in a voltage divider (not shown) to be controlled by the instantaneous level of the applied video signal. The constant amplitude, clamped, gamma-corrected video signal is then passed through a series blanking gate which deletes the preamplifier noise and spurious signal pickup during the camera blanking interval. The height of the blanking pedestal formed by the series gate is controlled by adjustment of the keyed clamp DC reference level. Finally, composite sync is mixed with the video signal and the composite video signal may then be buffered by a low impedance line driver circuit and transmitted to a monitor.

Refer again to FIG. 1. With normal operation at the correct operating point of the SEC vidicon tube 13 the video signal from the scene is amplified in video preamplifier 14 and an optimum video (picture) output is provided to the video automatic gain control, processing, display, transmission and other output circuits. Other output circuits could be provided. For example, a TV tracker could also be driven by the output of the video preamplifier 14.

The output from video preamplifier 14 is applied to the keyed clamp 35 which references the black level to ground and can provide blanking to prevent unwanted transients during the blanking interval from entering detectors 16 and 17. The ground referenced video level is applied through the field gating circuits 16 and 17 wherein selectively all or a portion of the scene is passed therethrough in accordance with the timing supplied by the sync generator and special multivibrator circuits (not shown). This is effected simply by gating the video that the detector circuits 16 and 17 receive when it is desired to provide ALC on a center fractional area of the total field of view. Othewise, this gate is continuously closed permitting the ALC to operate on the video as received from the total field of view.

The field gating comprises a pair of electronic switches 36 which selectively may switch on and off the synchronizing voltage from a synchronizing generator, multivibrator and other circuits which supply appropriate blanking voltages such that all or selected portions of the scene may be utilized. The output of the field gating circuits 36 are applied to the video peak detector 16 and video average detector 17. The video peak detector 16 may comprise a diode or an emitter follower which charges the ungrounded side of a capacitor which has its opposite side connected to ground. The peak signals conduct charge into the capacitor to charge the output voltage up to the peak value. The average detector essentially may comprise a resistor in series with the applied signal and a capacitor between the resistor and ground. The output impedance of the field gating circuit 36 is low when the switch is closed and appears substantially as an open circuit with the switch in open condition. This allows a simple RC integration circuit to be operated independent from the field gating circuitry 36. This enables the average output to be taken over whatever portion has been selected such that a true average independent of the time of gating is attained.

The output of the video peak detector 17 is applied to one end of weighting function potentiometer 16 and the average output of the video average detector 17 is applied to the other end of the weighting function potentiometer 18.

The video average detector 17 includes a buffer amplifier (not separately illustrated). The gain of the buffer amplifier may be adjusted such that for a typical scene of strictly passive targets, the output voltage of the video peak detector 16 and of the video average detector 17 will be approximately the same. This takes care of the situation where there are a number of self-illuminating objects such as fires. This enables the weighting function slider arm 58 of weighting function potentiometer 18, regardless of position, to provide an optimum output when the vidicon tube 13 is being properly operated. For a typical average scene without bright spots occuring within the field gate somewhat similar operation is enabled for any position to which the weighting function potentiometer 18 sliding arm 58 is set.

A prime consideration of the ALC operation is the time responsive to accommodate field of view switching and fast light transients. With automatic video gain control the apparent contrast variation under such transients is improved. However, the SEC target is vulnerable to overexposure and requires overload sensing capability. This capability is compromised if small light-level transients are allowed to drive the vidicon to target current levels associated with overload. An alternative would be to operate the vidicon at lower average target levels. This, however, sacrifices signal-to-noise ratio. From a total system standpoint, operation with a high target current operating point, in connection with a fast response feedback control loop to the SEC image section potentials (the gain determining element or SEC photocathode 30), provides the necessary fast response ALC action while maintaining high signal-to-noise ratio and high resolution.

Refer to FIG. 3. The FIG. 3 graphical representation shows a family of characteristic curves of operation wherein the vidicon 13 target current is plotted against the vidicon 13 photocathode illumination received from the image intensifier 12. The family of characteristic curves represents the SEC target current under various illumination conditions for various constant SEC cathode accelerating voltages (successively 7.0 kv. 4.5 kv. 3.5 kv. and 3 kv) as an example. The crossing points of the overload level line with the constant anodecathode voltage curves show the illumination levels at which sufficient target current is produced such that protection circuitry is enabled to close a shutter in the light path in order to protect the vidicon tube 13. For satisfactory operation, the shutter (not shown) should be continuously open and the scene continuously viewed. However, as discussed above, it is important that operation be maintained to the maximum extent somewhat below the overload level for high signal-to-noise ratio and resolution with necessary rapid ALC action.

Refer to FIG. 1 in conjunction with FIG. 3.

Assume some fixed scene illumination level is entering through optics 10 and lens assembly 11 and the image is amplified in image intensifier 12 such that SEC vidicon 13 is operating at its optimum operating point below the overload level. Such a point is represented by operating point Q in FIG. 3. This may correspond to an automatic light control level output from attentuator 20 of 1.5 volts as shown to the right of FIG. 3. With the SEC photocathode 30 operating at 4.5 kv, operation is at operating point Q when there is $5 \times 10^{\times 3}$ foot-candles illumination on the SEC photocathode 30.

Now assume a jump in light level to $5 \times 10^{\times 2}$ foot-candles. This could be caused, for example, by deliberately changing the field of view, or the scene being viewed or by transitory light changes such as flares, reflections, etc. With an increase in light level, an increase in video output of the SEC vidicon 13 results. The increased output is amplified in video preamplifier 14 and causes a corresponding increase at the output of weighting function 18. By amplification in DC amplifier 19 and variable attenuator 20, a corresponding increase in ALC level occurs at ALC point 50. Without the inner loop 40 this light increase would immediately translate the operating point Q along the 4.5 kv (kilovolt) curve upward and past the overload level. As seen along the 4.5 kv line, overload will be reached considerably before the $5 \times 10^{33}$ 2 foot-candles photocathode illumination is attained and the overload level condition would rapidly trip the shutter. However, due to the fast action of the SEC control loop 40 and the corresponding voltage reduction via the power supply 22 which is connected to the SEC high voltage input electrode, the operating point tends to follow the dashed line to point R. Point R is considerably below the overload level. Hence the overload protection circuit is not activated and the shutter is not tripped. At point R, the SEC electrode is being operated at about 3.3 kv. Throughout the transient excessively large target currents are not generated so that a relatively constant video image is maintained.

This is a transient condition and the iris loop 41 is not satisfied at point R. That is, referring to the right of FIG. 3, the ALC level point 50 voltage has changed from 1.5 volts to about 1.7 volts. This increase in voltage is coupled and amplified in iris threshold and amplifier stage 23. The threshold of dead zone diode circuit 25 is exceeded by a 0.5 volt ALC level change and hence is considerably exceeded by the 0.2 volt ALC change at point R. This signal is coupled to the iris motor amplifier 26. Iris motor amplifier 26 responsively actuates the iris motor 27 to close the iris 45 in lens assembly 11. As the iris 45 closes, the operating point follows along the dashed line from R to Q in that direction and the SEC operating voltage builds back up to the 4.5 kv optimum operating point. The 4.5 kv value is discussed herein by way of example to facilitate the explanation. A 5.5 kv operating point might prove to be the optimum condition and the circuit and the graph will be modified accordingly. Conversely with a change of light level in the opposite direction, there occurs a transient lowering of the ALC voltage at point 50, a rapid response of the inner feedback loop which will raise the photocathode voltage, for example, to 7.0 kv and the iris loop 41 will then go into operation (slightly delayed) causing the operating point to again to restored to point Q.

With small bright objects appearing within the gated field, the influence can be modified by appropriately adjusting the slider arm 58 of the weighting function potentiometer 18. This enables the scene to be substantially continuously viewed without unnecessary shutter closing and also without unnecessary loss of contrast of the remaining scene from the brightly illuminated area. The DC level output at the slider arm 58 is amplified in DC amplifier 19. DC amplifier 19 is a conventional direct coupled amplifier. The output of DC amplifier 19 is adjustable to provide desired ALC level at ALC level point 50 for optimum operating conditions of the SEC vidicon tube 13 by appropriately setting the slider arm (not numbered) of ALC reference level variable attenuator 20.

Refer again to FIG. 1 in conjunction with FIG. 3. Adjustment of the slider arm of the variable attenuator potentiometer 20 shifts the operating point locus point Q to provide higher or lower operating current for a given automatic light control level at point 50. In the SEC vidicon 13 control loop 40, the automatic light control level 50 is applied to high voltage power supply function circuit 21.

Thus, control of the ALC reference level (stabilizing video level) may be effected by adjustment of variable attenuator 20. As seen in FIG. 2, the range through which the reference level may be adjusted is equivalent to a change in scene brightness of more than eight orders of magnitude (horizontal distance from point A to point B).

Refer to FIG. 4. The high voltage power supply control function circuit 21 of FIG. 4 provides proper gain response with respect to increases and decreases in voltage at ALC level point 50 and compensates for the nonlinearities of the SEC vidicon tube 13 so as to cause it to provide a linear change in its gain with linear ALC level increases and decreases.

The high voltage power supply control function circuit 21 by its nonlinearity provides the advantage of stabilizing or minimizing the variation in loop gain (provides a constant loop gain) within the inner servo loop 40. Therefore oscillations, which would otherwise occur with feedback of relatively high loop gain, are not caused. Providing a relatively high loop gain with stability and without the circuit 40 going into oscillation provides faster operation.

Refer to FIG. 3 in conjunction with FIG. 1. Control function circuit 21 also provides the proper gain at low levels to enable the operating point locus to be shifted substantially flatly such that unwanted shutter closings are minimized. That is, it provides a reasonably flat Q-R curve.

At low voltage levels at ALC level point 50, the control function circuit 21 (see curve in block 21 in FIG. 1) provides a saturated output (considerably above zero ALC level) such that the accelerating voltage at the SEC vidicon 13 is at its maximum.

Refer again to FIG. 3. The implication of the saturated output considerably above zero ALC level is that when the iris 45 is open to maximum extent and because of too little light the system is forced to progress along the operating point locus away from point Q, as the light level is lowered (see dashed line to left of point Q) and maximum system sensitivity is achieved before the target current is reduced to low signal levels. This enables a high signal to noise ratio to be maintained and provides essentially optimum operating conditions down to the lowest useful illumination levels. System sensitivity is thus maximum at a point where there still is a high signal to noise ratio so that the system approaches the optimum manual operating conditions. For example, the signal current output is retained at about 100 nanoamperes target current even with a low illumination level of $10^{-3}$ foot-candles. That is, an operating voltage of 7.5 kv is reached while there is still relatively significant high target current of 100 nanoamperes.

Refer again to FIG. 4. A DC (direct coupled) amplifier 70, an input resistor 71 and a feedback resistor 91 are provided. Input resistor 71 is connected between the ALC level input poin 50 and the input to DC ampifier 70. Coupled between the output and the input of DC ampifier 70 is in series a feedback resistor 72, a diode 82, and a transistor 80. The collector of transistor 80 is connected to the input of DC amplifier 70, and the cathode of diode 82 is connected to the emitter of transistor 80. Connected in parallel across the feedback resistor 72 are respectively in series a resistor 83, and diodes 76, 75, 74 and 73. Between the junction of the cathode of diode 75 and the anode of diode 74 and the output of the DC amplifier 70 is connected a resistor 81. The diodes 73, 74, 75 and 76 are connected with their anodes toward the output side of the DC ampifier 70 and their cathodes toward the input side of the DC amplifier 70. The base of transistor 80 is connected through a plurality of diodes (not numbered) in series to the sliding arm of a SEC minimum gain potentiometer (not numbered), the resistance portion of which is disposed in a first bleeder resistor network between a plus 12 volts power supply source and ground. Feedback resistor 91 is coupled between the input and the output of the DC amplifier 70. Across resistor 91 is connected a transistor 90 and in series a diode 92. The cathode of diode 92 is connected to the output of DC amplifier 70 and its anode is connected to the emitter of transistor 90. The collector of transistor 90 is connected to the input to the DC amplifier 70. A second voltage bleeder network comprising a first resistor (not numbered), the resistance portion of an SEC maximum gain potentiometer, and a second resistor (not numbered) are provided and are connected between a minus 12 volts power supply source and ground. The base of transistor 90 is connected through a resistor (not numbered) to a plus 12 volts power supply source. Between the slider arm of the SEC maximum gain potentiometer and the base of transistor 90 are connected in series a pair of diodes 93 and 94. The anode of diode 94 is connected to the base of transistor 90 and its cathode is connected to the anode of the diode 93.

Direct coupled amplifier 70 in response to the ALC level input from point 50 provides a sloping transfer function in the region of 1.5 volts ALC level through the input resistor 71 and feedback resistor 91. A nonlinear portion in the region of 2 to 3 volts ALC level is provided by the action of diodes 73, 74, 75, and 76 and feedback resistors 72, 81 and 83. The region below 1 volt ALC level which is shown as a flat saturated response is provided by the action of the clamping transistor circuit of transistor 90 and its associated components. The output of the high voltage power supply control function 21 is a current source (not shown) at a point along the ALC level curve and is applied to the control input of the SEC high voltage power supply 22. High voltage power supply 22 comprises a DC to DC converter which has a signal control input which controls a square wave voltage into a transformer that is followed by a multiplier string to raise this voltage to the photocathode accelerating voltage desired for the SEC vidicon 13. The image intensifier 12 accelerating voltages must remain fixed with respect to the image intensifier 12 anode which may be electrically connected to the SEC vidicon 13 photocathode. The SEC vidicon 13 photocathode voltage varies between about 3 kv to 7 kv. This requires a separate power supply for each of the electrodes of the image intensifier 12 to be referenced ultimately to the SEC vidicon 13 photocathode 30 and to float as a battery up and down with the voltage. Optionally, if desired, inner loop 40 may be made to control the image intensifier tube 12 and the accelerating field in the SEC vidicon tube 13.

Refer again to FIG. 1 and in particular to the iris motor control loop 41. For an ALC level of 1.5 volts at point 50, for example, at point Q' (corresponding to point Q of FIG. 3) as illustrated in the block of high voltage power supply control function circuit 21, the output of iris threshold and amplifier stage 23 is zero. With an ALC output above point Q', that is above 1.5 volts, the iris threshold and amplifier stage 23 provides a positive output. This positive output is coupled into dead zone circuit 25. The dead zone circuit 25 requires an input represented by a 0.05 volt change at the ALC level 50. Thus, with a rise in ALC level above the threshold a sufficient amount, for example, to a point corresponding to point R in FIG. 3, the threshold and amplifier stage 23 is conducting continuously and the inhibiting of the dead zone circuit 25 is overcome to provide signal to the iris motor amplifier 26 and hence to the iris motor 27. Responsive to this condition the iris motor 27 shifts the position of the iris 45 in a direction to cause the signal output at the ALC level point 50 to go in a direction toward the level Q'. The device is bidirectional in that a sufficient lowering of the automatic light control level 50 will cause a current output in the opposite direction from iris and amplifier stage 23 and a sufficient change in the lower direction of the ALC level at the point 50 overcomes the dead zone circuit 25 inhibiting so as to cause the iris motor amplifier 26 to provide a signal in the opposite direction to the iris motor 27 to cause the level to be restored upwards to point Q' and the SEC accelerating electrode operating point to be restored to point Q (see FIG. 3).

The invention thereby provides a television system comprising automatic light control means operable over a wide dynamic range to regulate camera tube gain for stable and optimum operation at a constant video level with maximum scene viewing continuity while protecting against overloads and avoiding interference with other circuits. The system of the invention provides a dual mode loop arrangement wherein both loops incorporate nonlinear compensating features. The inner loop controls the accelerating field of a camera tube and may control an image intensifier. The outer loop controls a motor driven iris. The loops are coupled and compliment each other in that the inner loop responds quickly and aids in tube protection whereas the outer loop has the advantage of extreme dynamic range. The system provides antihunt circuitry to avoid unnecessary operation of the iris motor and shifting of the iris position by neglecting small signals which otherwise occur due to interaction between gain functions, the outer loop, the motor characteristics and gear train backlash.

While salient features have been illustrated and described with respect to particular embodiments, it should be readily apparent that modifications can be made within the spirit and scope of the invention, and it is therefore not desired to limit the invention to the exact details shown and described

What is claimed is:

1. An electro-optical system comprising:
   a. a lens system having an iris diaphragm,
   b. a television camera to convert light energy to video output signals,
   c. said television camera further comprising a non-linear gain determining element,
   d. a first feedback loop responsive to said video output signals to stably control said gain determining element to provide optimum operation below overloading of said camera said first loop including a compensating circuit having a non linearity substantially inverse to said non-linear gain of said non-linear gain determining element,
   e. a second feedback loop responsive to said video output signals to adjust said iris diaphragm to admit an amount of light energy for optimum video output signals below overloading of said camera, and,
   f. a dead zone circuit to inhibit actuation of said second feedback loop from adjusting said iris diaphragm until the energy in said video output signals changes a predetermined increment above or below a level of energy set for said optimum operation below overloading of said camera.

2. The electro-optical system of claim 1 wherein said first and second feedback loops comprise a detector responsive to said video output signals to rapidly provide a corresponding light control level, and a switchable field gate to selectively present a low output impedance in switch closed condition and to present a substantially open circuit to said detector means in switch open condition to provide an average over the switchable field.

3. The electro-optical system of claim 1 wherein said first feedback loop comprises:
   power supply means to supply voltage to said gain determining element to provide camera operation accordingly, and
   non-linear control function means to regulate said power supply means for non-linear control of said gain determining element to provide camera operation at a point for optimum signal to noise ratio, resolution, stability, and camera tube protection.

4. The electro-optical system of claim 3 wherein said non-linear control function means comprises:
   means saturable at low level input to cause early shifting of said power supply means to provide high operating voltage level output to said gain determining element to thereby provide gain at low input light levels with a high signal to noise ratio.

5. The electro-optical system of claim 1 further comprising:
   a. iris motor shaft means to position said iris diaphragm, and b. cam means to provide approximately linear logarithmic increasing and attenuation of light admitted by said iris diaphragm with variation of angular position of said shaft.

6. The electro-optical system of claim 1, and further comprising:
an electrical path common to said first and second loops, said path including:
keyed clamp means responsive to said video output from said camera to reestablish the level of said video output signals,
video peak and video average detectors each responsive to video output from said keyed clamp means to provide an output voltage level indicative of the strength of said video output signals,
adjustable weighting function means connected to the outputs of said video peak and video average detectors to provide a composite output voltage level between the average level and peak level, and
attenuator means responsive to said composite output voltage level to provide an adjustable light control voltage level.

7. The electro-optical system of claim 6, said common electrical path further including:
a field gate switch coupled between the output of said keyed clamp means and the input to said video peak and video average detectors to present low impedance to said detector means in periods of switch closed condition and to present high, substantially open, impedance to said detector means in periods of switch open condition to enable a true average output of said field gate switches to be selected independently of the time of gating.

8. An electro-optical system comprising:
a lens system having an iris diaphragm,
a television camera to convert light energy to video output signals,
said television camera further comprising a gain determining element,
a first feedback loop responsive to said video output signals to stably control said gain determining element to provide optimum operation below overloading of said camera,
a second feedback loop responsive to said video output signals to adjust said iris diaphragm to admit an amount of light energy for optimum video output signals below overloading of said camera,
a first concentrically graded neutral density filter,
a second neutral density filter having a transmission of the order of negative powers of 10, and
means to mechanically couple said second neutral density filter for insertion into and out of the light path of said lens system.

9. The electro-optical system of claim 8, and further comprising:
a. position sensing means to provide an output representative of the position of said iris diaphragm,
b. switching logic means enabled to be responsive to the output of said position sensing means to generate a signal when said position sensing means exceeds predetermined limits, and
c. a neutral density filter actuator responsive to enabling of said switching logic means to selectively insert and remove said second mechanically coupled filter into and out of the light path through said lens system.

10. The electro-optical system of claim 1 wherein:
a. said television camera comprises a secondary electron conduction vidicon, and
b. said gain determining element comprises a secondary electron conduction photocathode.

11. A television system comprising:
a. a first optical variable attenuation element,
b. an image intensifier coupled to intensify the images passing through said optical variable attenuation element,
c. an electronic variable gain element coupled to said image intensifier to convert the images from said image intensifer to electrical signals,
d. means to detect said electrical signals to provide an automatic light control voltage,
e. a first feedback loop comprising means rapidly responsive to said automatic light control voltage to control said electronic variable gain element to effect optimum gain operation below overloading of said gain element, and
f. a second feedback loop comprising means less rapidly responsive to said automatic light control voltage than said first feedback loop to control said optical variable gain element to provide in conjunction with said first feedback loop a constant optimum illumination on said electronic variable gain element.

12. The system of claim 11, said second feedback loop further comprising:
a. threshold means responsive to said automatic light control voltage to provide a signal upon departure from its value during said optimum gain operation, and
b. dead zone means responsive to exceeding of a predetermined increment by said departure signal to selectively actuate or inhibit varying of said optical variable gain element in accordance with said departure signal.

13. In a television system having a television camera tube to produce video output:
a. a camera tube gain determining electrode,
b. a source of camera tube operating voltage,
c. means to couple said source to said electrode,
d. means responsive to the video output to generate corresponding level signals,
e. non-linear control function means saturable at low video output levels to regulate said source to provide rapid increase of source voltage coupled to said electrode so that maximum system gain is achieved before target current from said camera tube is reduced to low levels.

14. In a television system having a television camera tube to produce video output:
a camera tube gain determining electrode,
a source of camera tube operating voltage,
means to couple said source to said electrode,
means responsive to the video output to generate the corresponding level signals, and
non-linear control function means saturable at low video output levels to regulate said source to provide an increase of source voltage coupled to said electrode so that maximum system gain is achieved before target current from said camera tube is reduced to low levels.

15. The system of claim 11 in which said first optical variable attenuation element comprises an iris having a mechanical control, in which the attenuation vs position of said control has a linear log characteristic.

16. The system recited in claim 11 in which said electronic variable gain element comprises an SEC vidicon, and said means rapidly responsive to said automatic light control voltage comprises a power supply connected to control the cathode voltage of said vidicon, and a power supply control function circuit connected to receive said automatic light control voltage and to control said power supply.

17. Apparatus as recited in claim 18 in which said power supply control function circuit comprises:
a direct coupled amplifier with a non-linear limiting circuit at one extreme and a cutoff circuit at the other extreme, the non-linearity of said control function circuit being adjusted substantially to compensate for the non-linearities of said vidicon to cause the gain of said vidicon to vary inversely and linearly with said light control voltage.

18. Apparatus as recited in claim 16 in which said power supply control function circuit comprises:
a direct coupled amplifier;
first, substantially constant, feedback means from the output to the input of said amplifier;
first non-linear means, including a first non-linear valve, connected between the output and input of said amplifier, said valve being adjustable to control the threshold of said amplifier; and
second non-linear means connected between the output and the input of said amplifier, including a second non-linear valve, said second valve being adjustable to control the saturation of said amplifier.

19. Apparatus as recited in claim 17 in which:
said first non-linear means comprises a resistor-diode circuit in series with the emitter-collector path of a first transistor, the base of said first transistor being connected to an adjustable, diode, circuit and to sources of biasing voltage to adjust the threshold of said amplifier; and
said second non-linear means comprises a diode in series with the collector-emitter path of a second transistor, the base of said second transistor being connected to a second adjustable, diode, biasing circuit including a voltage source to control the saturation of said amplifier;
the diodes and transistor of said first non-linear means being oppositely poled, from the output to the input of said amplifier, relative to the polarity of said diode and transistor of said second non-linear means.

* * * * *